Oct. 26, 1971        A. S. MICHAELS              3,615,024
                   HIGH FLOW MEMBRANE
                   Filed Aug. 26, 1968
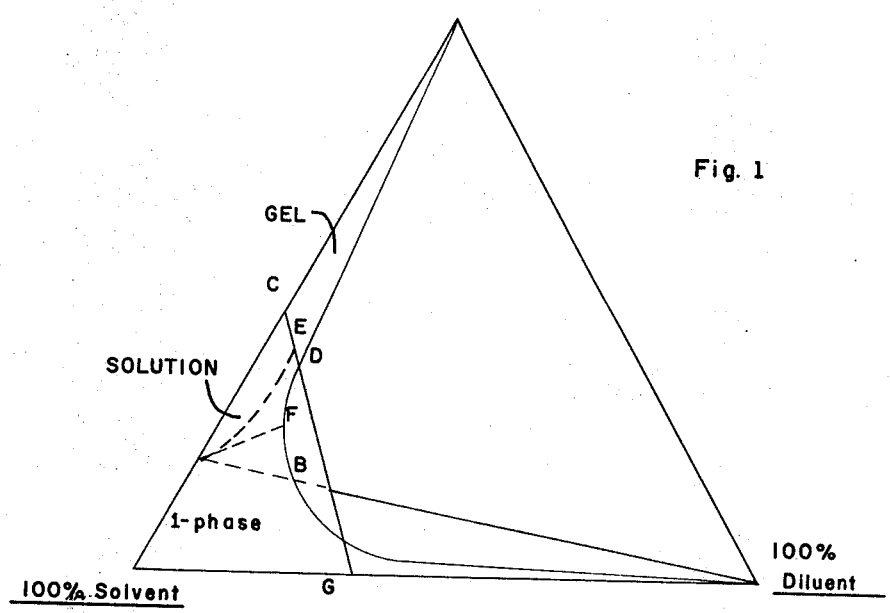
Fig. 1
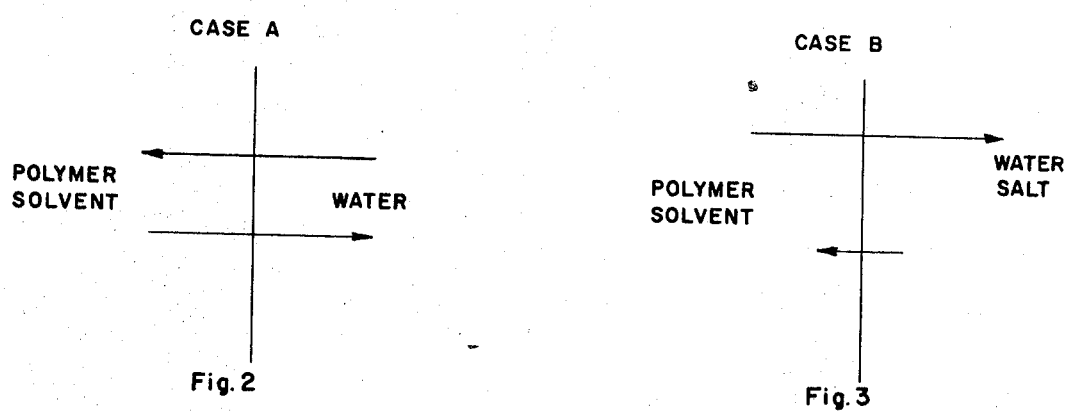
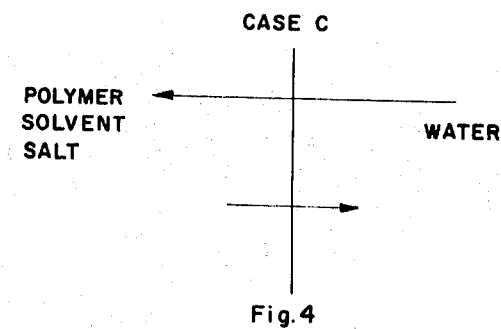

United States Patent Office

3,615,024
Patented Oct. 26, 1971

3,615,024
HIGH FLOW MEMBRANE
Alan S. Michaels, Lexington, Mass., assignor to Amicon Corporation, Lexington, Mass.
Continuation-in-part of application Ser. No. 669,648, Sept. 21, 1967. This application Aug. 26, 1968, Ser. No. 755,320
Int. Cl. B01d 13/00, 39/00
U.S. Cl. 210—490                6 Claims

ABSTRACT OF THE DISCLOSURE

An anistropic high flux low pressure polymeric membrane capable of being dried without loss of beneficial mechanical and processing characteristics, and having in a continuous polymer phase a barrier layer containing pores from 1 to 1000 millimicrons in diameter and an open porous support layer, the polymer absorbing less than 10 percent moisture at 100 percent relative humidity at 25° C.

RELATED APPLICATIONS

This application is a continuation-in-part of U.S. Ser. No. 669,648, filed Sept. 21, 1967 by Alan S. Michaels and entitled High Flow Membrane, now abandoned.

BACKGROUND OF THE INVENTION

This invention relates to processes of separation such as ultrafiltration and reverse osmosis processes.

Ultrafiltration is a process of separation whereby a solution, containing a solute of molecular dimension significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solutes of from about 500 molecular weight and above; the term is also conveniently used for processes involving, instead of dissolved molecules, colloidal-sized particles.

"Reverse osmosis" is a term conveniently reserved for membrane-separation processes wherein smaller molecules are involved, for example those molecules or solids which are of a size within one order of magnitude of those of the solvent.

The particular advantage of such membrane-modulated separation processes as described above lies in their potential speed, mild operating conditions and low operating cost compared to various other separation processes such as evaporation, dialysis, ultracentrifugation, chemical precipitation, and the like. These advantages become especially critical when thermally unstable or biologically active materials are to be processed or when relatively large volumes of solvent are present in a solution to be processed.

Successful membrane-modulated separation processes depend, in major part, upon the characteristics of the membrane utilized. Among the desired characteristics are:

(1) High hydraulic permeability to solvent: The membrane must be capable of transmitting liquid at high rates per unit membrane area under modest pressures.

(2) Sharp "retention-cut-off": The membrane should be capable of retaining completely, or very nearly completely, all solutes of a molecular weight (or size) above some first specified value and of allowing the passage of all solutes of a molecular weight (or size) below some second value which should be as close as possible to the aforesaid first value.

(3) Good mechanical durability under the chemical and thermal conditions of service. Most preferably, a membrane should be suitable for use in a wide range of chemical and thermal environment.

(4) A minimum dependence of solvent permeability upon the type or concentration of solute.

(5) High fouling resistance.

Until the present invention, two basic membrane-type filters have been available.

One type has an isotropic, sometimes called homogeneous, structure whose flow and retention properties are independent of flow direction. Such structures are typically produced in the form of sheets of from 0.1 to 0.010 inch in thickness. Such membranes are analogous to conventional filters and are virtually non-retentive for solutes of molecular weight under about one million. When attempts are made to prepare such membranes having a capability of retaining much smaller molecules, large decreases in hydraulic permeability occur. Such decreases result in too-low solvent flow rates through the membrane or restrict the usage of these isotropic membranes to very few, if any, practical applications. Moreover, such isotropic membranes are susceptible to relatively easy plugging by trapped solutes.

Another type of membrane used in ultrafiltration processes is the diffusive-type filter. In these filters, the solvent is transported by molecular diffusion under the action of a concentration or activity gradient. They differ from the aforesaid, filter-like, microporous membranes in that the migration of a solvent molecule from one location to another across the membrane depends substantially on the availability of a series of sites between the polymer matrix for molecules being transported. The mass-transfer capabilities of such membranes are highly temperature-dependent, exhibiting an activation energy. Such membranes contain few, if any, pores and are not suitable for the achievement of high flow rates. This is true even when these membranes are in the form of anisotropic membranes having a very thin barrier layer. Thus they do not find utility in large-volume industrial applications. Moreover the polymeric material from which such membranes are formed must have a high sorptivity for the solvent being transferred. One example is cellulose acetate which absorbs 15–20% of water and has found some utility in such diffusion-membrane separation processes as described in this paragraph.

SUMMARY OF THE INVENTION

A principal object of the instant invention is to provide novel anisotropic fluid permeable membranes for use in separation processes which membranes are characterized by unusually high hydraulic permeabilities: through substantially permanent microscopic pores, surprising fouling resistance, improved retention cut-off characteristics heretofore unattainable at such unusually high hydraulic permeabilities, and improved physical characteristics.

A further object of the invention is to provide a process for making such membranes from a wide selection of polymeric materials, independent of the sorptivity of the polymer for the fluid being transported.

The aforesaid principal object has been achieved by providing highly anisotropic, submicroscopically porous, membranes formed of polymers having good mechanical integrity, most advantageously those crystalline and/or glassy thermoplastic polymers known to the art. By crystalline and glassy polymers are meant those materials which possess from about 5 to 90% by weight crystallinity as measured by X-ray diffraction techniques known to the art and/or a glass transition temperature (Tg) of at least about 20° C. Particularly advantageous are polymers of inherently low water sorptivity, which unlike the cellulose acetate materials known to the membrane art may be allowed to dry during storage without losing their beneficial mechanical and processing characteristics.

These polymers are those having water-absorptivities of less than about 10% by weight of moisture at 25° C. and 100% relative humidity. However, polymers having higher water absorptivities may also be utilized if all other conditions and teachings of this invention are met.

The anisotropic membranes of the invention are prepared by:

(1) forming a casting dope of a polymer in an organic solvent
(2) casting a film of said casting dope
(3) preferentially contacting one side of said film with a diluent characterized by a high degree of miscibility with said organic solvent and a sufficiently low degree of compatibility with said casting dope to effect rapid precipitation of said polymer, and
(4) maintaining said diluent in contact with said membrane until substantially all said solvent has been replaced with said diluent.

The submicroscopically porous anisotropic membranes of this invention consist of an integral macroscopically thick film of porous polymer, usually more than about 0.002 and less than about 0.050 of an inch in thickness. One surface of this film is an exceedingly thin, but relatively dense barrier layer of "skin" of from about 0.1 to 5.0 microns thickness of microporous polymer in which the average pore diameter is in the millimicron range, for example from 1.0 to 1000 millimicrons—i.e., about one-tenth to one hundredth the thickness of the skin. The balance of the integral film structure is a support layer comprised of a much more coarsely porous polymer structure through which fluid can pass with little hydraulic resistance. By "integral film" is meant continuous, i.e. a continuing polymer phase. When such a membrane is employed as a "molecular filter" with the "skin-side" in contact with fluid under pressure, virtually all resistance to fluid flow through the membrane is encountered in the "skin," and molecules or particles of dimensions larger than the pores in the "skin" are selectively retained. Because the skin layer is of such extraordinary thinness, and because the transition from the skin layer to the macroporous support structure is so abrupt, normally less than about one-half the thickness of the barrier layer or less than one micron, the over-all hydraulic resistance to fluid flow through the membrane is very low; that is, the membrane displays surprisingly high permeability to fluids. Furthermore, tendency of such membranes to become plugged or fouled by molecules or particles is surprisingly low.

The discovery that such anisotropic membrane structures can be prepared by the casting and leaching of specially-formulated polymer solutions under controlled conditions is believed to be a consequence of unusual and heretofore unrecognized coaction of diffusion and polymer-precipitation phenomena which occur during a controlled leaching process.

When a solution of polymer in a "good" solvent is diluted with a polymer non-solvent (henceforth called a diluent) which non-solvent is miscible with the polymer solvent, one of two phenomena may occur:

(1) If the diluent has high affinity for the solvent, a diluting point is reached where the polymer is no longer compatible with the solvent/diluent mixture, and a homogeneous, elastic gel is formed; at this point, the polymer is "frozen" in an expanded, submicroscopically-porous configuration, and any further change in solvent/diluent ratio contacting the gel causes virtually no further change in gel microstructure.

(2) If, on the other hand, the diluent has relatively low affinity for the solvent, a diluting point is reached where two liquid phases form: one rich in diluent and containing little polymer, and one right in polymer and solvent and containing little diluent. On further dilution with diluent, the polymer-rich phase (which is still fluid) is gradually depleted of solvent, ultimately yielding a very finely microporous gel.

In both of the foregoing illustrations, however, the initial polymer solution can tolerate a substantial amount of diluent before gelation or phase-separation occur, and thus a relatively high-porosity polymeric structure will result.

If, on the other hand, the polymer is dissolved in a relatively poor solvent, addition of even a small amount of a polymer-incompatible diluent to that solution will result in rapid gelation. Under such circumstances, a polymer gel will be formed whose polymer solids content will be not much lower than that of the original solution. As a result, the polymer-solids content is high, a quite dense finely-textured structure will remain after leaching with diluent is completed.

However, it has been discovered that by proper selection of solvent and diluent, a variety of polymer gel-structures, of controllable porosity and pore-fineness can be prepared for a given polymer. In those instances where a single polymer solvent of the desired degree of polymer compatibility to achieve a desired gel-structure cannot be found, it is possible to employ mixtures of miscible solvents of differing compatibility with the polymer (both of which are miscible with the diluent) to achieve this purpose.

Although applicants do not wish to be bound by any particular theory of operation, the formation of the unique anisotropic membranes of the subject invention appears to be related to certain diffusional and osmotic solvent-exchange processes as described hereinbelow:

When a thin layer of polymer solution, deposited on a suitable substrate (to assure preferential contact of diluent with one surface) is contacted with diluent on one surface, diluent and solvent interdiffuse in the outermost layer almost instantaneously. Thus gelation or precipitation of the polymer takes place almost instantaneously. In view of the rapidity of this process, the topmost layer of the cast film solidifies as an exceedingly thin membrane skin whose porosity and pore-fineness are governed by the compatibility criteria developed above. As soon as this membrance skin is formed, however, the rate of penetration of diluent into the underlying region of the cast film, and rate of extraction of the solvent component is greatly retarded. (It must not, however, be stopped entirely. Under these circumstances, subsequent alteration in solution composition within the film occurs quite slowly. As a result there is opportunity, when a suitable solvent is present for slow phase-separation to occur to form a grossly microporous substructure consisting of large interconnected voids occupied by solvent/diluent solution, and an interstitial polymer matrix comprising consolidated, nearly solvent-free polymer. Hence, the formation of a highly permeable, coarsely microporous substructure is in large part due to proper selection of a solvent system for film-casting dopes and the selection of a proper diluent for coaction with the solvent system during the precipitation step.

The preferential contacting of the thin layer of polymer solution with diluent can be accomplished in a number of ways. One convenient method is to cast the film on an impermeable surface, e.g., a glass or metal surface. However, absolute impermeability is not required and paper supports which offer a reasonable degree of resistance to flow of diluent are also useful. Particularly advantageous are permeable non-wettable, non-woven sheets. For example, polyolefin fiber felts are not readily wettable by water, the diluent most often used. Moreover, they have good porosity and excellent mechanical and chemical properties which are useful with thin membranes requiring a porous support.

In dilution of a solution of a film-forming polymer with a liquid which is miscible with the polymer solvent but which is a non-solvent for the polymer, there always will exist a critical ratio of solvent to non-solvent at which two phases (one, rich in polymer and poor in non-solvent, the other poor in polymer and rich in non-solvent) form. The polymer-rich phase may be liquid (or quasi-liquid) or solid (or gel-like), depending upon the proportion of solvent which is present in that phase. As a general rule it is advantageous, for the formation of microporous anisotropic membranes, that the polymer-rich phase initially formed by non-solvent dilution to be relatively solid or gel-like, and thus relatively poor in solvent. This condition has been found to be satisfied when the non-solvent selected for the precipitation process is highly incompatible with (i.e. incapable of solvation of) the polymer, and/or the solvent is far more compatible with the non-solvent than with the polymer.

The fine-structure of the two-phase system produced under the above conditions is dependent upon (1) the volume-fraction of polymer present in the mixture, and (2) the *rate* at which the mixture-composition is changed to bring about precipitation.

With regard to (1), if the polymer concentration is low (e.g. of the order of 3% or less), the polymer-rich phase will tend to be discontinuous (i.e. present as discrete droplets or particles) while the polymer-poor phase will be continuous. On the other hand, if the polymer concentration is high (e.g. of the order of 50% or higher), the polymer-rich phase will be continuous, and the polymer-poor phase discontinuous (i.e. present as discreet droplets). At polymer concentrations between 10% and 40%, however, it frequently happens that *both* polymer-rich and polymer-poor phase are continuous—that is, a polymer-rich matrix containing an interconnecting array of voids filled with polymer-poor liquid is produced. It is under these latter conditions of precipitation that suitably structured anisotropic microporous membranes can be formed if the rate of formation of skin layer is carefully controlled.

With regard to (2), it has been found that the more rapidly a liquid mixture is brought to the condition of precipitation, *the finer is the degree of dispersion of the precipitating phase*. Hence, the more rapidly a suitably concentrated polymer solution is diluted with non-solvent, the smaller will be the pores within the polymer matrix which are formed on phase-separation. Moreover, within any region of a polymer solution where the rate of dilution by non-solvent is constant up to the point of precipitation, the sizes of all the pores formed within the precipitated matrix will be virtually identical. Virtual uniformity of pore-size at the face of the thin barrier layer is regarded as an important property for the formation of the most useful permselective, and anisotropic microporous membranes because such uniformity will assure the sharpest size-discriminating quality of the membrane.

When, however, a two-continuous phase polymer/liquid structure is formed under the conditions described above, interfacial forces acting at the polymer/liquid interfaces have been found give rise to capillary stresses acting upon the (solid) polymer phase, which tend to cause collapse of the matrix, and coalescence or elimination of the liquid-phase occupying the void spaces. The magnitude of these capillary stresses is believed to be related to the Young/Laplace relation $$\Delta P = 2\gamma PL/r$$

where $\Delta P$ represents the tensile stress imposed on the polymer, $\gamma PL$ the interfacial tension between polymer and liquid, and $r$, the radius of the pore or void. From this, it is evident that, the *finer* is the pore-texture (i.e. the smaller is $r$), the *higher* is the stress on the polymer. On the other hand, the capacity of the polymer to withstand stress without permanent deformation (i.e. its "yield" or "creep" stress) is dependent upon its elastic modulus and/or creep relaxation modulus; this, in turn, is dependent upon (1) the glass transition temperature or crystallinity of the polymer, and (2) its degree of solvent-plasticization. If the polymer phase is soft or viscoelastic (corresponding to a low modulus as is often encountered above the glass transition temperature or in polymers having a very low level of crystallinity, and/or in polymers having high degree of solvent plasticization) when precipitation takes place, and/or if the void-size within the polymer is extremely small, the polymer will creep or flow, with either complete elimination of voidage, or with the formation of a reduced volume-fraction of much larger voids. In such event, either the capacity of the polymer to permeate fluids at high rate will be lost, or its capacity to effect separations on a molecular scale may be lost. Consequently, if highly porous, highly permeable, molecularly-permselective anisotropic membranes are to be produced by this precipitation process, it has been found necessary and desirable that the polymer selected for the purpose exhibit either a high glass transition temperature, or high level of crystallinity, or both.

It has been found that the lower is the interfacial tension $\gamma PL$, the smaller will be the tendency to collapse and consolidation of the polymer matrix. Thus, if the non-solvent being used to effect precipitation is a polar liquid such as water, finer-pore-texture structures will be produced if the polymer employed is relatively polar (meaning low $\tau LP$), or if a surfactant or other solution modifier is added to the non-solvent (thereby reducing $\gamma LP$).

If a thin layer of polymer solution is cast with one side sealed against an impermeable plate, and this plate is immersed in a non-solvent bath, counter diffusion of solvent and non-solvent commences instantaneously across the cast-film/bath interface. At the outset, the concentration gradients of solvent and non-solvent in the immediate vicinity of the interface are very large and, according to Fick's law of diffusion, the rate of transfer of solvent and non-solvent at that interface are enormous. Thus, it has been found that the rate at which the polymeric phase is caused to precipitate from solution at that interface is enormous, and thus (from above) the pore-texture within the polymer very near that interface is exceedingly fine. Deeper within the polymer-solution-layer, however, the rate-of-change of solvent/non-solvent ratio with time becomes necessarily slower.

Thus, as the diluent penetrates deeper into the cast-film layer, the rate of concentration change with time decreases very rapidly, and thus so does the rate of polymer precipitation. As a consequence (provided that the polymer employed has a suitably high modulus and rigidity to sustain the existence of very small pores), a structure will be produced which structure will be a highly anisotropic, microporous membrane of the subject invention, whose pore-size varies with distance from the "skin" or outermost surface to the supporting-plate surface. The pore size is much the smallest in the skin and grows rapidly as the distance from the skin increases.

The skin, in order to be in the range of from 0.1 to 5 microns in thickness should be formed in from $10^{-5}$ to 2.5 seconds; the most advantageous membranes are formed in $10^{-5}$ to about $10^{-1}$ seconds.

It is thus evident why a film formed in this fashion possesses the characteristic anisotropy which is so important to the production of high-permeability, molecularly permselective, microporous membranes. It should be noted that, if the polymer selected has a relatively low glass transition temperature, or is highly solvent-plasticized when precipitation occurs, capillary-stresses, within the small-pore-containing "skin" layer may be sufficient to cause collapse and consolidation of that layer, leading to a "skin" comprised of non-porous polymer. Such a membrane will thus behave as a so-called "diffusive" anisotropic permselective membrane, i.e. a membrane across which fluid flow is primarily determined by chemical characteristics of the polymer rather than the hydrodynamics of flow through micropores.

Film-forming polymers useful in the invention include, but are not limited to, the following:

Polycarbonates, i.e. linear polyesters of carbonic acids in which carbonate groups recur in the polymer chain, by phosgenation of a dihydroxy aromatic, such as bisphenol A. Such materials are sold under the trade designation Lexan by the General Electric Company;

Polyvinylchlorides; one such material is sold under the trade designation Geon 121 by B. F. Goodrich Chemical Company;

Polyamides such as polyhexamethylene adipamide and other such polyamides popularly known as "nylon." One particularly advantageous material is that sold under the trade name "Nomex," by E. I. du Pont de Nemours, Inc.

Modacrylic copolymers, such as that sold under the trade designation Dynel and formed of polyvinyl chloride (60%) and acrylonitrile (40%), styrene-acrylic acid copolymers and the like.

Polysulfones such as those of the type characterized by diphenylene sulfone groups in the linear chain thereof are useful. Such materials are available from Union Carbide Corporation under the trade designation P-1700;

Halogenated polymers such as polyvinylidene fluoride sold under the trade designation Kynar by Pennsalt Chemical Corporation, polyvinylfluoride sold under the trade name Tedlar by E. I. du Pont de Nemours, Inc. and the polyfluorohalocarbon sold under the trade name Aclar by Allied Chemical Corporation;

Polychloroethers such as that sold under the trade name Penton by Hercules Incorporated, and other such thermoplastic polyethers;

Acetal polymers such as the polyformaldehyde sold under the trade name Delrin by E. I. du Pont de Nemours & Co., and the like;

Acrylic resins such as polyacrylonitrile polymethyl methacrylate, poly n-butyl methacrylate and the like;

Other polymers such as polyurethanes, polyimides, polybenzimidazoles, polyvinyl acetate, aromatic and aliphatic, polyethers, and the like may also be utilized.

The large number of copolymers which can be formed by reacting various proportions of monomers from which the aforesaid list of polymers were synthesized, are also useful for preparing membranes according to the invention. This statement of course applies only to those copolymers whose crystallinity and/or glassy characteristics are suitable for fabrication of the novel membranes described herein.

Perusal of the above illustrative list of polymers operable in the present invention will reveal that, as a general rule, relatively polar polymeric materials are preferred. This is true primarily because it is an easier task to select operable systems of non-hazardous solvents, co-solvents, and economical wash fluids when polar polymers are used. In general, non-polar polymers such as polyethylene require a more exotic system of solvents, and consequently are not as conveniently adapted for economic and safe operation of the process. Nevertheless, they can be utilized in practice of the invention when required to provide a membrane of particular characteristics.

In general, preferred polymers for embodiment in this invention are those which exhibit modest levels of crystallinity at ambient temperatures, e.g., between about 5% to 90% crystallinity as measured by X-ray diffraction analysis and/or those which display relatively high glass transition temperatures, (e.g., at least 20° C., and preferably higher). Polymers meeting these requirements, as a rule, yield membranes with good mechanical strength, resistance to collapse at elevated pressures, and good long-term stability at elevated temperatures.

Solvents will generally be chosen for their ability to form a film-forming casting dope with the polymer from which a membrane is to be prepared. A degree of solubility of at least about 5% by weight of the polymer in solvent is usually required. Thickening agents may be added to the casting dope to provide viscosity necessary for casting, but such agents will usually affect liquid flow rate through the resulting membrane.

On the other hand, some such thickening agents such as pyrogenic silica and the like will result in membranes having improved strength characteristics.

The art provides a number of useful approaches to selection of particular solvent systems for particular polymers. The Polymer Handbook edited by Brandrup and Immergut (John Wiley and Sons, New York, 1966) provides some especially helpful chapters. Particular attention is called to the chapters entitled "Solvents and Nonsolvents for Polymers" by Klaus Meyerson and "Solubility Parameter Values" by H. Burrell and B. Immergut in addition to the large quantity of other data contained in Section IV of this work. Further aid in selecting appropriate polymer-solvent mixtures is provided in the Journal of Paint Technology, Volume 38, May 1966, by Crowley et al in an article entitled "A Three-Dimensional Approach to Solubility" and in the Journal Paint Technology, Volume 39, No. 505, February 1967, by Hansen in an article entitled "The Three-Dimensional Solubility Parameter-Key to Paint Component Affinities."

Study of these references will inform one skilled in the art of numerous solvents which can be selected with a new to cohesive energy density (as defined by a so-called Solubility Parameter), hydrogen bonding tendency, and polarity for use with a given polymer system. In general it may be stated that the higher the solvency of a given for a polymer, higher flux rates will be attainable with membranes cast from a casting dope of given concentration.

Among the many specific polymer-solvent systems which applicant has found to be useful in forming casting dopes are the following:

TABLE I

| System No. | Polymer | Solvent |
|---|---|---|
| 1 | Acrylonitrile (40)-vinyl chloride (60) copolymer (Dynel). | N,N'-dimethylformamide (DMF). |
| 2 | Acrylonitrile (40)-vinyl chloride (60) copolymer. | Dimethylsulfoxide. (DMSO). |
| 3 | do | N-methyl-pyrrolidone. |
| 4 | do | Dimethylacetamide (DMAC). |
| 5 | Polyacrylonitrile | DMF. |
| 6 | do | DMAC. |
| 7 | Polysulfone | N-methyl pyrrolidone. |
| 8 | do | N,N'-dimethypropionamide. |
| 9 | Polyvinylchloride | DMF. |
| 10 | do | DMAC. |
| 11 | Polyvinylidene chloride | DMF. |
| 12 | Polycarbonate | DMF. |
| 13 | Polystyrene | DMF. |
| 14 | Polyn-butyl methacrylate | DMF. |
| 15 | Polymethylmethacrylate | DMF. |
| 16 | Polysulfone | Cyclohexanone. |
| 17 | Polymer 360 | DMAC. |
| 18 | do | DMF. |
| 19 | do | DMSO. |
| 20 | Polyacrylonitrile | 70% $ZnCl_2$ (aqueous). |
| 21 | Polycarbonate | DMSO. |
| 22 | do | DMAC. |
| 23 | do | Tetrahydrothiophene. |
| 24 | do | n-Butyrolactone. |
| 25 | do | N'N'-diethylformamide. |
| 26 | Polyvinylchloride | N',N-diethylpropionamide. |
| 27 | do | n-Butyrolactone. |
| 28 | Polymer 360 | Tetrahydrothiophene. |
| 29 | Dynel | Ethylene carbonate. |
| 30 | do | N',N'-diethylpropionamide. |
| 31 | do | Tetrahydrothiophene. |
| 32 | do | N',N'-diethylformamide. |

All of the above polymer-solvent systems yielded film-forming casting dopes at a range of concentrations between 5 and 20% of polymer by weight. All of these casting dopes could be formed into fluid permeable anisotropic membranes according to the invention which membranes where characterized by surprisingly very high hydraulic flow rates in view of their retention characteristics, that is their effective ultrafiltration pore size.

Casting dopes prepared from the above list of polymers and solvents may be used directly and processed at very moderate temperatures usually 25° C. to 90° C. to cast useful, highly selective membranes.

Examples of these are the polyvinylchloride, polycarbonate, and acrylonitrile-vinylchloride polymers when each is formed into a dope with DMF. However, usually the pore-structure of the membranes can be further modified by the addition of a "solution-modifier" and/or by the further moderate increases in the temperature of the casting and wash operations, and/or by changes in polymer concentration in the casting dope.

Solution modifiers are often advantageously selected to increase the solvating effect of the overall solvent system. The use of such a solution modifier will tend to loosen, i.e., decrease the rejection efficiency of a membrane at a given molecular size cut-off level. By "increased solvating effect" is meant an increase in compatability or the degree of proximity to formation of an ideal solution.

Conversely, a solution-modifier which reduces the solvating effect of the overall solvent system tends to increase rejection efficiency but to decrease the flux rate of a membrane at a given "molecular-size" cut-off level.

To illustrate this with respect to making a Dynel membrane with water as the diluent and DMF as the primary solvent:

DMF has a Solubility Parameter (cal./cc.)$^{1/2}$ of 12.1 and is a strong to medium hydrogen bonding solvent, and has a dipole moment of 2. Water has a Solubility Parameter of 23.4, is a strong hydrogen bonding solvent, and has a dipole moment of about 1.8.

Thus a solution modifier used in the process of the invention and having a Solubility Parameter of 10.0, medium hydrogen bonding tendency, and a dipole moment of 2.9 would be expected to decrease the solvating effect on Dynel and thus would tend to "tighten" the Dynel membrane. Such is the case with acetone used as a solution modifier, for example in the quantity of 5% based on weight of total solvent. Tetrahydrofurane is an example, of another such modifier.

On the other hand, a solution modifier having about the same dipole moment as DMF and a strong affinity to water would function more like the $ZnCl_2$ type of inorganic salt to be discussed below, and has sufficiently greater compatibility with water than DMF to "loosen" the membrane, i.e., increase the flux attainable across the membrane at a given pressure. Such is the case with formamide used as a "solution-modifier," for example in the quantity of 5% based on the weight of the total solvent. This is in spite of the fact that bare reference to the solubility parameter of formamide F would lead one to believe that its use would result in a poorer solvent for Dynel and, consequently, a more retentive membrane.

In general, a large number of such solution modifiers can be selected for a given polymer-solvent system. The selection can be made, not only from the classical lists of organic solvents, but also from solid organic compounds which may be solubilized in the primary solvents.

Another class of solution modifiers are the inorganic electrolytes dissociable inorganic solutions, for example many halides, nitrates and the like. Some such compounds are $FeCl_3$, LiBr, LiCl, $Al_2(NO_3)_2$, $CuNO_2$ and NaCNS and the like. These materials which, in solution tend to have a solvating effect on polar polymers and tend to increase the flux rate attainable with membranes cast from solutions in which they are incorporated as solution modifiers. Some such inorganic electrolyte solution modifiers particularly useful in the systems described in Table I include those exemplified by the list in Table II below.

TABLE II

| System | Solution modifier | System | Solution modifier |
|---|---|---|---|
| 1 | $ZnCl_2$ | 2 | $ZnCl_2$ |
| 1 | $FeCl_3$ | 4 | $LiNO_3$ |
| 1 | LiBr | 6 | LiCl |
| 1 | $(Al)_2(NO_2)_3$ | 11 | $ZnCl_2$ |
| 1 | NaCNS | 12 | $ZnCl_2$ |
| 1 | $CuNO_2$ | | |

The effect of these salts which act as solvating aids for polymers is quite the opposite when they are incorporated in the diluent.

Organic and other liquid solution modifiers particularly useful in the systems described in Table I include those exemplified by the list in Table III below:

TABLE III

| System | Solution modifiers |
|---|---|
| 1 | Tartaric acid. |
| 1 | $H_2O$. |
| 1 | $HCONH_2$. |
| 1 | Dioxane. |

The diluent, as has been stated before, should be compatible with the solution modifier and primary solvent which form the total solvent systems to be leached from a cast membrane. Water, the most convenient diluent will normally be utilized in all systems in which it is operable. Occasionally a mixture of water and an organic solvent will provide a more suitable diluent; in such cases the organic solvent can often be selected from the solution modifier or primary solvent or a mixture of the two. However, it is suggested that some polymer dopes such as those incorporating nylon, would be better washed with an organic solvent such as methanol, fusel oil, gasoline or the like; while those incorporating polyvinyl chloride-dissolved in methyl isobutyl ketone could be washed with naphtha.

It is often possible, by means of a quick qualitative analytical test, to judge whether a particular diluent will be suitable for use with a particular casting solution: If the addition of a few drops of a prospective diluent to the casting solution brings about immediate precipitation of the polymer, good membranes can generally be formed.

The polymer solids in the casting solution will usually range from about 5% to 40% of the polymer-solvent mix. The precise concentration of polymer solids must be high enough to form a good film-forming dope and low enough so that the precipitated membrane does have some pore volume in its barrier layer. If a given solution yields an impermeable membrane, a decrease in concentration usually results in obtaining a permeable microporous membrane. Film dopes are advantageously from about 50 to 5000 cps. in viscosity. Solution modifiers, when utilized, are generally present in concentrations ranging up to about 10% of the polymer-solvent mix. Usually this concentration is from about 1 to 6%.

A small quantity of polymer non-solvent, for example a material such as water or other diluent, will sometimes be useful as an additive in the casting dope formulation. The function of such a fluid in the casting dope can be, in many formulations, its action as a thickening agent in a system in which it is not highly compatible. Another function of such a non-solvent can be its tendency to interfere with, to some extent, any premature consolidation of the gel structure.

Process steps which have been discovered to be particularly advantageous in preparation of casting dopes for use in the instant process include the steps of clarifying the casting dope by centrifugal action before drawing films therefrom. This clarification need not be so complete as to, for example, cause the elimination of a Tyndal effect from a casting dope containing inorganic salts. As an alternate to the foregoing procedure, it sometimes is possible to obtain this clarification by pH modification of the casting dope. For example when $ZnCl_2$ is used as in inorganic electrolyte co-solvent, some zinc oxychloride and/or hydroxide appears in the casting dope. A few drops of hydrochloric acid tends to solubilize these salts and greatly lessen the magnitude of Tyndal effect of the casting dope. It is also desirable to keep the casting dope agitated between preparation and use in making film drawdowns. For example, keeping it on a laboratory ball mill between the actual preparation of drawdowns of membranes was found to add significantly to the uniform character of the membranes produced from one drawdown to the other.

Another method for increasing the rejection efficiency of the membranes formed by the instant invention is to post-treat them in a bath at elevated temperatures. Typical after treatment temperatures will range from 50 to 90° C., although higher temperatures may be used to achieve the desired results with some polymers. In any case these post treatments should be at temperatures between the secondary transition temperature and the softening point of the polymer being treated. The time of such after treatment need not be great, usually 10 seconds to 10 minutes will achieve a significant decrease in porosity; the precise time, of course, depends considerably on such factors as temperature selected, wettability of the membrane surface, etc.

In general, Dynel membranes according to the present invention which have water fluxes in the range of 250 to 300 ft.$^3$ gal./ft.$^2$ per day at 100 p.s.i.g. usually exhibit total rejection of Cytochrome C, a cellular protein having a 13,000 average molecular weight.

ILLUSTRATIVE EXAMPLES OF THE INVENTION

Included below are a number of examples of the process of the invention and the novel products produced thereby. Most of these examples are illustrative of membranes having pore sizes between 10 and 500 millimicrons, i.e. the size most advantageous in polymer fractionation processes; they are not intended to be limiting. Although illustrative of the advance in the art achieved by the instant invention, it is expected that those skilled in polymer chemistry will be able to select appropriate polymers, solvents, solution modifiers and diluents to form porous membranes appropriately balanced in chemical resistance, retentivity and flux characteristics to meet the requirements of any particular application.

In each of the following examples "flux rate," unless otherwise described, is the rate at which distilled water is observed to pass through the membrane when free of solute.

Example 1

A 15% solution, i.e., a casting dope, was prepared by dissolving powdered poly (bisphenol A-carbonate) in N,N'-dimethylformamide (DMF). The solution was prepared at a temperature of from about 60 to 70° C. Subsequently the solution having a viscosity of about 20 cp. (measured at 23° C. with a Brookfield Spindle at 60 r.p.m.) was drawn down in a 0.014-inch film on a glass substrate. Prior to the drawdown, tape was placed on the glass along the intended edges of the membrane to assure its continued adherence to the glass plate during washing. This adherence is necessary in order to avoid the precipitation of a barrier layer on the backside of the membrane. Moreover, the tape aids in minimizing membrane shrinkage in subsequent processing steps. The draw film was covered with a shimmed-up glass plate to protect it from dust and the like as it levelled for a period of about one minute. Then the draw film was washed by submersion in a water bath, i.e. the diluent, for 15 minutes at 20° C., during which time a porous polycarbonate membrane was formed. The membrane had an anisotropic structure, i.e. there was a relatively tight thin "skin" portion on the upper surface thereof, but a much "looser" structure below this skin.

In testing the membrane, 400 ccs. of an aqueous solution containing 1% by weight of Dextran 110 (a trade name for a dextran of 110,000 molecular weight) was placed in a pressurized batch cell. The first 10 ccs. of filtrate through the membrane are discarded. The next 10 ccs. of filtrate are used to judge initial performance characteristics of the membrane. At an applied pressure of 50 p.s.i.g., a water flow rate of 1.54 cm.$^3$/min.-cm.$^2$ (i.e., about 541 gallons per ft.$^2$ per day) was measured, and all of the Dextran passed through the membrane.

An albumin solution of 0.03% weight concentration was also subjected to ultrafiltration with the membrane of the example: 90% of the albumin was rejected at a flow rate through the membrane of about 71 gallons per ft.$^2$ per day.

This testing was carried out at about 25° C. Unless otherwise stated, the same general test for determining water flux are used in all subsequent examples.

Example 2

An unplasticized powdered polyvinyl chloride resin with a specific viscosity of 0.66 sold under the trade designation Geon 121, was dissolved in DMF at a temperature of about 65° C.; the solution contained eight parts resin and 100 ccs. of DMF. A drawdown 0.020 inch thick was effected on a glass substrate as described in Example 1. After washing with water at room temperature for 15 minutes a portion, the resulting membrane was tested and found to be anisotropic.

Water flux rate was 362 gallons per ft.$^2$ per 24 hours at 25° C. and 50 p.s.i.g. applied pressure.

On testing the flux and rejection characteristics, the following results were obtained:

| Applied pressure, p.s.i.g. | Solute in water | Flux, gals./ft.$^2$ per 24 hrs. | Rejection, percent |
|---|---|---|---|
| 50 | 1.0% dextran 110 | 128 | 0.0 |
| 25 | 0.03% albumin | 49 | 95 |
| 25 | 0.15% globulin | 23 | 95 |

When methyl alcohol was used as the wash solution (i.e., precipitant) instead of water, the following rejection characteristics were obtained:

| Applied pressure, p.s.i.g. | Solute in water | Flux gals./ft.$^2$ per 24 hrs. | Rejection, percent |
|---|---|---|---|
| 50 | 1.0% dextran 110 | 250 | 0 |
| 25 | 0.3% albumin | 60 | 17 |
| 25 | 0.15% globulin | 20 | 88 |

The flux rate of distilled water across the methanol-washed membrane was 430 gallons per ft.$^2$ per 24 hours.

Example 3

The procedure of Example 2 was repeated, except that 4% by weight of ZnCl$_2$ was incorporated into the casting dope to act as a solution modifier. The membranes were then tested in the same manner as the membranes of Example 2 had been tested. The rejection characteristics of the membranes were substantially maintained but the flux rates during the processing of dextran and albumin solutions increased from 128 and 49.0 gallons to 530 and 81 gallons respectively. However, the flux rate during globulin retention dropped to about 17.6 gallons.

Water flux at 50 p.s.i.g. and 25° C. was 590 gallons per ft.$^2$ per day.

Example 4

A casting dope was prepared from 13 grams of a modacrylic fiber sold under the trade designation Dynel; 87 grams DMF and 5 grams ZnCl$_2$. A 10-mil drawdown on a glass plate was allowed to level for 60 seconds; and washed in water at about 20° C.

The membrane was tested for rejection characteristics with a dilute solution of a 0.3% solution of albumin at 25 p.s.i.g. Complete rejection of albumin was realized. Flow rate of distilled water through the membrane was about 400 gallons per day per ft.$^2$ at 100 p.s.i.g.

Example 5

When the formulation of Example 4 was modified to decrease the polymer concentration thereof.

| | Parts |
|---|---|
| Dynel | 9 |
| DMF | 91 |
| ZnCl$_2$ | 5.0 |

The flux rates of distilled water reached to 6500 gallons per day per ft.$^2$. Dextran 110 was not rejected, but albumin was rejected completely when the membrane was tested at 100 p.s.i.g.

When the formulation of Example 4 was further modified by increasing the polymer concentration thereof.

| | Parts |
|---|---|
| Dynel | 15 |
| DMF | 85 |
| ZnCl$_2$ | 5 |

The flux rate of distilled water dropped to about 1380 gallons per day per ft.$^2$ at 100 p.s.i.g. However, rejection of B-lactoglobulin of molecular weight 35,000, Dextran 110, and albumin were all very nearly complete. Thus it is clear that variation in polymer solids within a given system can be utilized to give "tighter" or "looser" membranes according to the use to which the membrane is to be put.

Examples 6–9

The following casting dopes were prepared:

| Example | 6 | 7 | 8 | 9 |
|---|---|---|---|---|
| Dynel | 13 | 13 | 17.5 | 14.5 |
| DMSO | 87 | 87 | 20.0 | 20 |
| ZnCl$_2$ | 2.5 | | | |
| Phenylphosphonic acid | | 5 | | |
| Formamide | | | 10.0 | 10.0 |
| Acetone | | | 52.5 | 55.5 |
| Flux, 100 p.s.i.g.[1] | 1,300 | 1,300 | 100 | 330 |

Flux rates are in gallons of distilled water per day per ft.$^2$.

Example 10

Five grams of a polysulfone available under the trade designation P1700 was dissolved in 45 grams of N-methyl-2-pyrrolidone to 30° C. The resulting casting dope was drawn into an 11-mil film on a glass plate. The film was allowed to level for a minute and then was dipped into a water bath at 25° C. for 5 minutes.

The resulting anisotropic membrane had an average water flux, at 100 p.s.i.g., of about 462 gallons per ft.$^2$ per day over a 40-minute test period. This membrane rejected 77.4% of Dextran, 110 at 50 p.s.i.g. and 25° C. The flux rate during this rejection average about 32 gallons per ft.$^2$ per day.

Other permeable polysulfone membranes were made using (1) N,N'-dimethyl propionamide as the solvent and methanol as the diluent; (2) cyclohexanone as the solvent and methanol as the diluent.

Example 11

This example demonstrates the fact that it is possible to vary the rejection and flow characteristics of membranes of the invention by relatively simple modifications in the nature of the casting solvent.

In general, all of the membranes, 11a through 11c of this example were prepared by dissolving 15 grams of a general purpose polycarbonate powder, such as that used in Example 1 and sold under the trade designation Lexan, in 100 ccs. of solvent at about 60–70° C., then casting a 12-mil. film on a glass plate. After standing a minute each film was dipped into a water bath for about 15–20 minutes at 30° C. Each membrane was then dried and tested for rejection characteristics with a 1% solution of Dextran 110 but at various pressures as seen in Table 11.

TABLE 11

| | 11a | 11b | 11c |
|---|---|---|---|
| Solvent used: | | | |
| DMF, cc. | 100 | 99 | 75 |
| Dioxane, cc. | | 10 | 25 |
| Water flux at 50 p.s,i.g. (gals./ft.$^2$-24 hrs.) | 770 | 215 | 17.6 |
| Rejection, percent of Dextran 110 at: | | | |
| 10 p.s.i | 0 | 67 (17.6) | 97 (2.1) |
| 25 p.s.i | 0 | 15 (5.2) | 93 (—) |
| 50 p.s.i | 0 | 4 (59.5) | 79 (9.8) |
| 100 p.s.i | 0 | 0.4 (112.0) | 51 (25.6) |

Note.—Ultrafiltration flux rates, in gals./24 hrs.-ft.$^2$, are shown in parenthesis.

Example 12

The test described in Example 11 was applied to polyvinyl chloride membranes prepared according to the procedure of Example 2 from a polyvinyl chloride supplied by Goodrich Chemical Co. under the trade designation Geon 121. Eight grams of the resin was dissolved in the indicated solvent and 12-mil. drawdowns were prepared, washed, and tested as had been done in Example 12. Membranes 12a, 12b and 12c were then tested with results shown in Table 12.

TABLE 12

| | 12a | 12b | 12c |
|---|---|---|---|
| Solvent used: | | | |
| DMF, cc. | 100 | 75 | 50 |
| Acetone | 0 | 25 | 50 |
| Water flux at 50 p.s.i. gals/ft.$^2$-24 hrs.) | 352 | | 194 |
| Rejection of Dextran 110: | | | |
| 10 p.s.i | 0 | 26 (21.1) | 55 (28) |
| 25 p.s.i | 0 | 14 (27.0) | 22 (3.5) |
| 50 p.s.i | 0 | 5 (39.0) | 21 (70) |
| 100 p.s.i | 0 | 0 (111.) | 2 (91) |

Note.—Ultrafiltration flux rates, in gals./24 hrs. per ft.$^2$, are shown in parenthesis.

Example 13

A reagent grade of polymethylmethacrylate is available under the trade designation "Polymer-Practical" from Mathison, Coleman and Bell, Inc. A 20% solution of this polymer in DMF was formed, drawn down and water washed according to the procedure of Example 1. A membrane of about 6 mils thickness was formed. This film permitted a water flux of about 1060 gallons per 24 hours per ft.$^2$ at 50 p.s.i.g. It showed no retention for Dextran 110 in a 1% test solution at 50 p.s.i.g.

Example 14

A 10% solution of a relatively highly chlorinated polyvinylchloride sold under the trade designation Hi-Temp by Goodrich Chemical Company, in DMAC was formed, cast into a film and water-washed according to the procedure described in Example 1. The completed film was found to have a water-flux rate of about 1000 gallons per ft.$^2$ per day at 50 p.s.i.g. It passed all Dextran 110 in a 1% test solution.

The above procedure was carried out again, but using DMF instead of DMAC as the solvent. The membrane so produced was also demonstrated to have a water-flux rate of about 1500 gallons per ft.$^2$. It showed no retention for Dextran 110 in a 1% test solution at 50 p.s.i.g.

Example 15

A solution comprising (1) 20 grams of another relatively highly chlorinated polyvinylchloride polymer, sold under the trade designation Geon 222 by Goodrich Chemical Company, and (2) 100 ccs. of DMSO was prepared and titrated with a few drops of water. The titrating immediately resulted in a clumped precipitate forming in the solution.

Thereupon a 12-mil. thick film of the solution was drawn as has been described above. Upon precipitation with water, a membrane was formed which was 5.9 mils thick.

The initial water flux, across the membrane at 50 p.s.i., was 470 gallons per ft.$^2$ per 24 hours. On testing the characteristics of the membrane with a 1% solution of Dextran 110:

| Applied pressure, p.s.i. | Flux, gals. per ft.$^2$/per day | Rejection, percent |
|---|---|---|
| 10 | 28 | 4 |
| 25 | 63 | 6 |
| 50 | 150 | 4 |

The difference between Geon 222 and Hi-Temp is believed to be that, in the former the additional chlorine atoms are attached to already chlorinated carbons, while in the latter the additional chlorine atoms are attached to carbon atoms which would be non-chlorinated in ordinary poly(vinylchloride).

Example 16

A polymer available under the trade name Polymer 360 from 3M Company, Inc. was dissolved in each of DMAC, DMF and DMSO; cast into films, and washed according to the procedure set forth in Example 1:

| Membrane: | Polymer 360 concentration, percent | Solvent | Water flux gals. per ft. per 24 hrs. |
|---|---|---|---|
| A | 13 | DMSO | 476 |
| B | 13 | DMF | 840 |
| C | 13 | DMAC | 94.5 |

When tested for rejection of Dextran 110:

| Membrane: | Applied pressure, p.s.i. | Flux, gals. per ft.² per 24 hrs. | Percent rejection |
|---|---|---|---|
| A | 10 | 17.5 | 87 |
| | 25 | 17.5 | 67 |
| | 50 | 28.0 | 61 |
| B | 10 | 24.5 | 78 |
| | 25 | 24.5 | 23 |
| | 50 | 42.0 | 9 |
| C | 10 | 14.0 | 65 |
| | 25 | 24.5 | 25 |
| | 50 | 38.5 | 6 |

Although the major unity of the novel microporous anisotropic membranes of the invention is believed to be in separations involving the transport of liquid across the membrane, the following example demonstrates the utility of the membranes in separation of gaseous mixtures.

Example 17

The relative permeability of one such membrane to oxygen and carbon dioxide was determined at 35° C. using a one atmosphere driving force across the membrane. The upstream side of the membrane, i.e. the oxygen and carbon dioxide gases, was maintained at two atmospheres and the downstream side of the membrane was at one atmosphere. The permeability of each gas is shown below in terms of cubic centimeters of gas per second at standard temperature and pressure conditions per square centimeter of membrane surface.

Relative permeability to oxygen and carbon dioxide

Oxygen _____ $8.25 \times 10^{-8}$
Carbon dioxide _____ $1.77 \times 10^{-7}$

The porosity of the film to carbon dioxide is seen to be greater than twice the permeability of the film to oxygen.

The anisotropic membrane used in this example was of the modacrylic polymer sold under the tradename Dynel.

In order to aid those skilled in the art, the following explanation of the probable mechanics of the instant process is presented with respect to the drawings in which:

FIG. 1 is a 3-component phase diagram

FIGS. 2–4 are diagrammatic representations of certain phenomena discussed below.

With reference to FIG. 1 is a phase diagram for the testing system consisting of polymer, solvent and water, the possible routes to gelation are discussed as follows:

Line CG is the tie line. The line A–B–D is the line travelled by the polymer casting dope as water diluent is gradually added thereto. As water diffuses into the casting solution, solvent diffuses out. Indeed since the final membrane thickness is often only about ⅓ or so of the original draw-down thickness, it appears that the volume of solvent diffusing out is greater than the volume of water diffusing in. The line A–C represents the hypothetical situation where the rate of diffusion of water into the casting dope to be zero, i.e., wherein only solvent diffuses out of the casting solution. In practice most membranes will taken an intermediate path between the two extremes defined by the lines A–B–D and A–C.

These intermediate paths are defined by lines A–F and A–E. The nearer to line A–C the true path is, the lower the porosity of the final structure; whereas the closer to the line A–B–D the true path is, the higher the porosity of the membrane. The exact situation at the gel point will be governed by the relative rates of migration of water into and solvent out of the casting solution.

Case A shown in FIG. 2 is a diagrammatic representations of a polymer dissolved in pure solvent in contact with the wash bath water.

Case B—shown in FIG. 3 is a diagrammatic representation of a polymer dissolved in pure solvent in contact with a wash bath solution which has a good deal of salt dissolved in it.

Case C—shown in FIG. 4 is a diagrammatic representation of the case when the casting solution consists of polymer, solvent and a salt in contact with pure water in the wash bath.

The rate of transport of water into the casting solution will be in the order;

$$C > A > B$$

whereas the rate of transport of solvent out of the casting solution will be in the order;

$$B > A > C$$

This may be explained with reference to the effect the salt has on the chemical potential of the water and solvent in the two different phases. In case C, water enters quickly and solvent diffuses out relatively slowly; the membrane so formed is fairly impermeable. Salts in the casting dope generally expand Dynel whereas 20% NaCl in the wash solution, makes Lexan/DMF drawdowns impermeable.

It is to be noted that gradually, all diluent-soluble inorganic salts will have the same kind of tightening effect on the membrane when incorporated in the diluent regardless of whether or not they would function as solvating aids if incorporated into the polymer solution.

Moreover, inorganic compounds like methanol and other alcohols, i.e. water-miscible materials that do not have the high polarity and solubility parameter of such compounds as formamide, can be added to the diluent to give more open membranes. Their function in the diluent may be a slight slow-down in the membrane-precipitation rate, the opposite of the effect that they would have in the casting dope.

Example 18

A 12-mil polycarbonate (Lexan' drawdown was formed at about 25° C. of a casting solution consisting of 15 grams polymer in 100 cc. of DMF. On washing with water alone as a diluent, a membrane was formed which membrane was characterized by a 774 gallons per square foot per day water flux at 50 p.s.i.g. No rejection of Dextran 110 contained in a 1% aqueous solution was attainable with this membrane which had a thickness of about 7.2 mils.

Upon modifying this membrane-forming procedure by including 20% by weight of sodium chloride in the water diluent, a membrane was formed which had no water flux at 50 p.s.i.g. and was only 4.5 to 5.0 mils thick.

Example 19

(B) A polyvinyl chloride (Geon 121) membrane was formed of a 12-mil drawdown of a casting solution consisting of 8 grams polymer in 200 cc. of DMF and subsequent washing with water alone as a diluent. This membrane was characterized by a water flux of about 352 gallons per day per square foot at 50 p.s.i.g. This membrane had a total thickness of 3 mils and would not reject any Dextran 110 in a 1% aqueous solution at 50 p.s.i.g. test pressure.

Upon modifying this membrane-forming procedure by including 20% by weight of sodium chloride in the wash water, a membrane was formed which had a water flux of 163 gallons per day per square foot under the indicated test conditions. Moreover, this membrane rejected 30% of Dextran 110 from a 1% aqueous solution at 10 p.s.i.g. applied pressure. The thickness of this membrane was 2.0 mils.

The following example illustrates the use of other than organic solvent systems to form anisotropic membranes of the present invention.

Example 20

Ten grams of a polyacrylonitrile fiber sold under the trade designation Orlon was dissolved with agitation in a solution comprising 70 grams of zinc chloride hydrate and 30 grams of water at about 95° C.

This solution was allowed to stand at room temperature in order to allow gas bubbles, which were entrained in the solution during agitation, to escape. A 7-mil drawdown of this solution was made on a glass plate, let stand for three minutes and bathed for 15 minutes in a 70° C. water bath.

The resulting anisotropic membrane exhibited a water flux of 400 gallons per day per square foot at 25° C. and an applied pressure of 110 p.s.i.g. When tested with an aqueous solution containing 5000 parts per million of albumin, 90% rejection of the ablumin was achieved at 110 p.s.i.g. and 25° C.

What is claimed is:

1. An anisotropic microporous polymeric high flux low pressure membrane comprising
   a barrier layer at a surface thereof having plurality of pores from 1 to 1000 millimicrons in diameter, and integal with said barrier layer a support layer said barrier layer and support layer being a continuous uninterrupted polymer phase, said support layer being of sufficiently open porous structure that it provides no significant increase in overall resistance to hydraulic flow through the membrane,
   the polymeric material of said membrane absorbing less than about 10% of moisture at 100% relative humidity at 25° C., and said membrane retaining its beneficial mechanical and processing characteristics after drying.

2. A membrane as defined in claim 1 wherein said barrier layer is from about 0.1 to 5.0 microns in thickness.

3. A membrane as defined in claim 2 in which the polymer is selected from the group consisting of polycarbonate, polysulfone, polymers and copolymers of vinyl chloride, including a 60:40 copolymer of vinyl chloride with acrylonitrile, and polymethylmethacrylate.

4. A membrane as defined in claim 1 wherein said polymer has a crystallinity of from about 5 to 90% by weight.

5. A membrane as defined in claim 1 wherein said polymer has a glass transition temperature of at least about 20° C.

6. A membrane as defined in claim 1 wherein the transition from microporous barrier layer to macroporous layer takes place within a distance of less than about one-half the thickness of said microporous layer.

References Cited

UNITED STATES PATENTS

| 3,332,894 | 7/1967 | Cantor et al. | 210—23 X |
| 3,423,491 | 1/1969 | McLain et al. | 210—321 X |

OTHER REFERENCES

Michaels, "Polyelectrolyte Complexes," from I. & E. Chem., vol. 57, No. 10, October 1965, pp. 32–40, relied on.

Saline Water Conversion Report for 1963, received in Patent Office, Jan. 15, 1965, may be ordered from Superintendent of Documents, U.S. Gov't Printing Office, 187 pages, pp. 29–32 relied on.

"Research and Development of New Polymer Systems for Reverse Osmosis Membranes," Office of Saline Water R & D Report No. 167, received in Patent Office, Feb. 14, 1966; 38 pages, pp. 1, 6–12 and 26–31 relied on.

"Research and Development of New Polymer Systems for Reverse Osmosis Membranes," Office of Saline Water R & D Report No. 220, November 1966; 46 pages, pp. 3, 8 and 22 relied on.

FRANK A. SPEAR, JR., Primary Examiner

U.S. Cl. X.R.

210—500

PO-1050
(5/69)

UNITED STATES PATENT OFFICE
CERTIFICATE OF CORRECTION

Patent No. __3,615,024__                    Dated __October 26, 1971__

Inventor(s) __Alan S. Michaels__

It is certified that error appears in the above-identified patent and that said Letters Patent are hereby corrected as shown below:

Column 4, line 45, after "entirely", insert --)--;

Column 5, line 29, "phase" should be plural;

Column 6, line 24, " $\gamma$LP" should be -- $\gamma$LP--;

Column 8, line 20, after "Journal", insert --of--;

Column 8, line 26, "new" should be --view--;

Column 8, line 29, after "given", insert --system--;

Column 15, line 30, "unity" should be --utility--;

Column 15, line 75, "taken" should be --take--;

Column 16, line 1, "extremes" is misspelled;

Column 16, line 35, "gradually" should be --generally--;

Column 16, line 50, delete the apostrophe after "Lexan" and insert instead --Lexan)--;

Column 17, claim 1, line 29, after "having", insert --a--.

Signed and sealed this 11th day of April 1972.

(SEAL)
Attest:

EDWARD M. FLETCHER, JR.
Attesting Officer

ROBERT GOTTSCHALK
Commissioner of Patents